3,296,303
METHOD FOR THE PREPARATION OF AMIDES
Joseph W. Nemec, Rydal, and Harry R. Raterink, Drexel Hill, Pa., and Stanley W. Wise, Audubon, N.J., assignors to Rohm & Haas Company, Philadelphia, Pa., a corporation of Delaware
No Drawing. Filed Aug. 23, 1963, Ser. No. 304,249
7 Claims. (Cl. 260—558)

This invention deals with a method for the preparation of amides. It more particularly is concerned with the preparation of polyamides. It is especially concerned with the preparation of specific diamides.

The present process is most particularly concerned with the preparation of amides having the structure

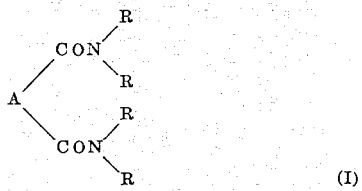

(I)

wherein R represents hydrogen, alkyl of 1 to 4 carbon atoms or alkenyl of 3 to 4 carbon atoms. Preferred embodiments include those in which R represents hydrogen or methyl. An especially favored category is that in which all R's represent hydrogen. The symbol A represents a hydrocarbon bridge containing 2 to 24 carbon atoms, preferably 3 to 12 carbon atoms, and may be cyclic or acyclic, aromatic or aliphatic. When A is aliphatic, it may be straight or branched in any of the known configurations with the restriction that there must be at least two carbon atoms in A separating the amide groups to which A is connected.

Typical embodiments of R include hydrogen, methyl, ethyl, isopropyl, butyl, allyl and butenyl. The symbol A may typically be ethylene, trimethylene, butylene, hexylene, heptylene, nonylene, decylene, dodecylene, octadecylene, dipropyldodecylene, cyclohexylene, cyclopenthylene, ene, methylhexylbutylene, dibutyldecylene, dioctylhexylene, dipropyldodecylene, cyclohexylene, cylclophentylene, phenylene, methylphenylene, dibutylphenylene, methyldodecylphenylene and dinonylphenylene.

It is to be noted that A can include hydrocarbon substituents as long as one carefully observes the carbon atom content of the total group and as long as there are two carbon atoms in the group A bridging the two amide groups to which they are attached.

The amides of the present invention are prepared by a reaction involving the compound having the formula

(II)

in which X is hydrogen or a glycol moiety, to be more fully described hereinafter. The symbol X must be restricted to groups derived from ethylene glycol, propylene glycol and diethylene glycol. Accordingly, in the above formula, X represents hydrogen or hydroxyethyl, hydroxypropyl and hydroxyethoxyethyl.

When X represents hydrogen, the reactant is an acid and must be converted into one of the other embodiments of X, described hereinbefore, before being amidated. When X represents an embodiment other than hydrogen, then the amidation is direct.

The amidation is carried out by reacting with the ester form of the reactant, the compound

(III)

wherein R has the significance previously set forth.

Typical embodiments of reactant (II) include succinic acid, glutaric acid, adipic acid, pimelic acid, suberic acid, azelaic acid, sebacic acid, brassylic acid, thapsic acid, octadecanedioic acid, diethylsuccinic acid, dibutylsuccinic acid, ethylbutylglutaric acid, dihexylglutaric acid, dimethyladipic acid, dibutyladipic acid, methylhexylpimelic acid, ethylbutylsuberic acid, dibutylazelaic acid, hexyloctadecanedioic acid, phthalic acid, isophthalic acid, terephthalic acid, methyldodecylisophthalic acid, octylisophthalic acid, cyclohexanedioic acid, and octylcyclohexanedioic acid. Also typical of reactant (II) are the aforementioned acids in the form of their diesters of ethylene glycol, propylene glycol, and diethylene glycol.

Typical of reactant (III) are ammonia, methylamine, dimethylamine, ethylamine, diethylamine, allylamine, and butenylamine.

While the present process preferably contemplates the use of a dicarboxylic acid or a defined ester thereof, it is quite possible to conduct the present process with advantageous results using polycarboxylic structures, such as pentanetricarboxylic acid, hexanetricarboxylic acid, trimellitic acid, trimesic acid, pyromellitic acid, and mellitic acid, among others.

If one desires to start with reactant (II) in its acid form, there is reacted therewith a glycol containing the moiety X, as hereinbefore described. The glycol is used in excess with respect to the acid in a molar ratio of at least about 3:1 and preferably about 6:1 to 12:1. The use of the excess glycol serves to aid in making the esterification substantially quantitative. Also, the excess glycol provides a favorable reaction medium for the subsequent amidation. The glycol is particularly an excellent solvent for the ammonia or amine reactant. The esterification is conducted by heating the reaction mixture to reflux and removing the evolved water as the reaction progresses. The esterification is desirably continued until an acid number of about three or less is reached for maximum commercial value.

At the conclusion of the esterification or if reactant (II) was originally employed wherein X was other than hydrogen, the amidation is conducted in the temperature range of about 25° to 130° C., preferably about 70° to 100° C. While the reaction may be readily started and conducted at room temperature or slightly thereabove, the preferred temperature range of 70° to 100° C. is conducive to substantially shorter reaction times. Furthermore, using the higher reaction temperatures, the product is in a more desirable crystalline form, whereas at the lower reaction temperatures and longer reaction times, the product tends to be more of the powdery nature.

The amidation step is conducted by employing reactant (III) at at least a 2:1 and preferably at least a 3:1 molar ratio with respect to reactant (II) in its ester form. An especially effective way is to add reactant (III) until the system is saturated and then continue to supply the reactant (III) as it reacts with the ester form of reactant (II). In most instances, the diamide product is insoluble in the excess glycol employed and will settle out as the reaction continues. At the conclusion of the reaction, the amide is separated by mere filtration. If desired, the amide product may be washed with water or other suitable solvent to remove any glycol adhering thereto. Both the excess glycol and the excess reactant (III) may be recovered and used in subsequent runs, thus effecting desirable economies in the present process.

The amidation reaction may be conducted at atmospheric, reduced or raised pressures as desired. It is preferred to use atmospheric pressure or pressure somewhat greater than atmospheric. Yields of 80 to 90% and above are consistently achieved and the products have good color.

There is, accordingly, provided a direct route from the dicarboxylic or polycarboxylic acid to the corresponding diamide or polyamide. The critical consideration is the specific diester or polyester embodiments, described hereinbefore. Only by strict adherence to the definitions of X that lead to the ester structures can one skilled in the art achieve the valuable results of the present invention. Prior art processes, even when ester reactants, other than those hereinbefore defined, are employed, are characterized by relatively low yields of the desired diamide or polyamide products. Prior art processes are plagued with undesired by-product mixtures containing, in the case of dicarboxylic structures, one amide group and one ester group, one amide and one acid group, two nitrile groups, or one acid and one nitrile group. Polycarboxylic structures, by prior art methods, lead to even more complex and less desirable results. In contrast, by strict adherence to the teachings of the present invention, one obtains a consistent yield of 80 to 90% and more of high purity product in the substantial absence of considerable amounts of undesired by-products.

The present invention may be more fully understood from the following examples, which are offered by way of illustration and not by way of limitation. Parts by weight are used throughout.

*Example 1*

There are added to a stirred autoclave 944.2 parts of the ethylene glycol diester of adipic acid (a 4:1 ratio by weight of glycol to acid, an acid number of 2.5). There are then introduced through a dip tube 188 parts of liquid ammonia (300% excess). A mild exothermic reaction occurs, raising the temperature from 25° to 40° C. and creating 60 p.s.i.g. After the exothermic reaction has subsided, heat is applied and the temperature raised to 80° C. The rise in temperature increases the pressure to 130 p.s.i.g. The temperature is maintained at 80° C. for one hour and is then raised to 100° C. in fifteen minutes. It is maintained at the latter temperature for one and a half hours, during which time the pressure increases to 160 to 165 p.s.i.g. At the completion of the reaction time, the batch is vented to atmospheric pressure and 126.8 parts of unreacted ammonia are recovered for recycling. The reaction mixture is cooled to 20° C. and filtered through a pressure filter. The ethylene glycol filtrate (562 parts) is recovered for recycling. The filter cake (375 parts) is slurried with 600 parts of hot water. It is then cooled, refiltered and dried in an oven. The product is a white powder melting at 225° to 227° C. and contains 49.99% carbon (theoretical 49.98%), 8.45% hydrogen (theoretical 8.39%), and 19.16% nitrogen (theoretical 19.43%). The product is obtained in the amount of 194 parts (92.8% yield) and is identified as adipamide.

*Example 2*

There are charged to a polyethylene lined, 5-gallon pail 15,620 parts of the ethylene glycol diester of adipic acid (22.69 moles of adipic acid). Gaseous ammonia is introduced by bubbling into the solution until 1390 parts (80% excess) are dissolved. The lid is placed on the pail and the contents allowed to stand at room temperature for five days. The mixture is filtered and the filter cake is washed and dried. The solid product is identified as adipamide and is obtained in the amount of 2830 parts (86.5% yield).

*Example 3*

There are added to a reaction vessel 1000 parts (1.03 moles based on sebacic acid) of the ethylene glycol diester of sebacic acid (4:1 ratio by weight of ethylene glycol to sebacic acid, 1.8 acid number). There are then introduced 199 parts of ammonia (400% excess) using the technique of Example 1, but there is obtained in a yield of 86.4% a white powder melting at 208° to 211°C. The product contains 60.04% carbon (theoretical 59.97%), 10.05% hydrogen (theoretical 10.06%), and 13.77% nitrogen (theoretical 13.99%).

*Example 4*

There are added to a reaction vessel 5 parts of the ethylene glycol diester of succinic acid (4:1 ratio by weight of ethylene glycol to succinic acid). There is then added 1 part of ammonia and the reaction continued as in Example 1. The product, a white powder, is obtained at a yield of 91.6%. The product contains 24.1% nitrogen (theoretical 24.1%) and decomposes at 257° C.

*Example 5*

There are added to a reaction vessel 1.42 moles of diethylene glycol ester with pimelic acid (4:1 ratio by weight of ethylene glycol to pimelic acid). There are then introduced 11.7 moles of ammonia according to the techniques of Example 1. A crude reaction product is recovered by filtration which is water-soluble. The product is purified by slurrying with acetone and then recrystallizing from methanol. A white, crystalline solid, melting at 173° to 175° C. is obtained. The product contains 53.18% carbon (theoretical 53.14%), 9.26% hydrogen (theoretical 8.92%), and 17.56% nitrogen (theoretical 17.71%). The product is identified as pimelamide.

*Example 6*

There are introduced into an autoclave 5 parts of the ethylene glycol diester of azelaic acid (4:1 ratio by weight of ethylene glycol to azelaic acid, an acid number of 1.8). There is then introduced 1 part of ammonia. The crude reaction product is water-soluble and is purified by slurrying with acetone and recrystallizing from methanol. The product is dried, yielding a white, crystalline powder. The product melts at 175.5° to 177.5° C. and contains 58.06% carbon (theoretical 58.04%), 9.88% hydrogen (theoretical 9.74%), and 14.82% nitrogen (theoretical 15.04%). The product is identified as azelamide.

*Example 7*

Into an autoclave there are introduced 5.1 parts of ethylene glycol (4:1 ratio by weight of ethylene glycol to glutaric acid, acid number 0.65). There is then added 1 part of ammonia and the reaction continued as in Example 1. The product is filtered, slurried with acetone and recrystallized from methanol. A white crystalline powder is obtained melting at 180° to 183° C. giving a yield of 74%. The product contains 21.5% nitrogen (theoretical 21.5%) and is identified as glutaramide.

*Example 8*

There are charged to an autoclave 104 parts of ethylene glycol diester of isophthalic acid (4:1 ratio by weight of ethylene glycol to isophthalic acid, an acid number of 0.8). There are introduced 21.4 parts of ammonia (125% excess based on isophthalic acid) at such a rate that the pressure is maintained at 150 to 160 p.s.i.g. while the batch is heated to 90° to 100° C. The temperature is maintained at this level for five hours at the end of which time the reaction is vented, cooled, and filtered. The filter cake is washed and dried giving 43.2 parts (96%) of a white powder, melting at 278° to 279° C. The product contains 16.9% nitrogen (theoretical 17.1%) and is identified as isophthalamide.

In a similar way, there is obtained terephthalamide by replacing the ethylene glycol diester of terephthalic acid for the corresponding isophthalic acid diester.

*Example 9*

There are added to an autoclave 1.4 moles of the ethylene glycol diester of adipic acid (3:1 ratio by weight of ethylene glycol to adipic acid). There are then introduced 11.6 moles of monomethylamine and the reaction continued according to the procedure of Example 1. There is obtained a water-soluble product which is washed with acetone and then recrystallized from the dimethyl ether of diethylene glycol. The product is obtained and has a melting point of 157° C. The product contains 16.2% nitrogen (theoretical 16.3%) and is identified as N,N'-dimethyladipamide.

Example 10

There are added to a glass flask 568 parts of the ethylene glycol diester and adipic acid (4:1 ratio by weight of ethylene glycol to adipic acid). There are then added with stirring 400 parts (312% excess) of allyl amine. The reaction is heated four and one-half hours under reflux at 54° C. and then allowed to stand 48 hours at room temperature. The product is filtered and washed with acetone. There are obtained needle-like, white crystals, in a yield of 92.7%, which melt at 160.5° to 161.5° C. The product contains 64.01% carbon (theoretical 64.24%), 9.16% hydrogen (theoretical 8.94%), and 12.33% nitrogen (theoretical 12.49%). The product is identified as N,N'-diallyladipamide.

Example 11

There are added to a reaction vessel 1.8 parts of the ethylene glycol diester of adipic acid and 1 part of ethanolamine. The reaction mixture is heated at 120° to 125° C. for two hours while being stirred. The reaction mixture is cooled, filtered, and washed with acetone. A white, crystalline solid is obtained in a yield of 50.4% having a melting point of 135.5° to 136° C. The product contains 12.06% nitrogen (theoretical 12.06%) and is identified as N,N'-β-hydroxyethyladipamide.

Example 12

There are added to a reaction vessel 5.1 parts of the diethylene glycol diester of adipic acid (4:1 ratio by weight of diethylene glycol to adipic acid). There is then introduced 1 part of ammonia and the reaction is continued according to Example 1. The product is filtered, washed with water, and dried. The product is obtained and identified as adipamide.

Example 13

There are added to a reaction vessel 5.1 parts of the propylene glycol diester of adipic acid (4:1 ratio by weight of propylene glycol to adipic acid). Ammonia is added in the amount of 1 part and the reaction continues as in Example 1. The product is filtered, washed with water, and dried. It is identified as adipamide.

We claim:
1. In a method for the preparation of carboxylic acid diamides having the formula

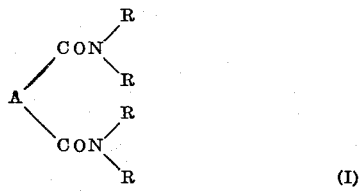

(I)

by reacting a corresponding carboxylic acid diester with a compound having the formula

(II)

in a temperature range of about 25° to 130° C. employing a molar ratio of at least 2:1 of said (II) to said (I) in which
R is a member selected from the class consisting of hydrogen, alkyl of 1 to 4 carbon atoms and alkenyl of 3 to 4 carbon atoms,
A is a hydrocarbon group of 2 to 24 carbon atoms wherein there is always at least two carbon atoms between the two amide groups to which A is connected,
the improvement which comprises employing said ester having the formula

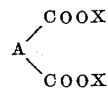

wherein X is selected from the class consisting of hydroxyethyl, hydroxypropyl and hydroxyethoxyethyl.

2. A method according to claim 1 wherein
R is hydrogen,
A is ethylene, and
X is hydroxyethyl.

3. A method according to claim 1 wherein
R is alkyl of 1 to 4 carbon atoms,
A is ethylene, and
X is hydroxyethyl.

4. A method according to claim 1 wherein
R is hydrogen,
A is tetramethylene, and
X is hydroxyethyl.

5. A method according to claim 1 wherein
R is alkyl of 1 to 4 carbon atoms,
A is tetramethylene, and
X is hydroxyethyl.

6. A method according to claim 1 wherein
R is hydrogen,
A is phenylene, and
X is hydroxyethyl.

7. A method according to claim 1 wherein
R is alkyl of 1 to 4 carbon atoms,
A is phenylene, and
X is hydroxyethyl.

References Cited by the Examiner

UNITED STATES PATENTS 2,957,915   10/1960   Kokorudz _____ 260—561
3,035,041   5/1962   Schwyzer et al. __ 260—561 XR

FOREIGN PATENTS 530,151   9/1956   Canada.

OTHER REFERENCES

Fijolka et al.: Chemical Abstracts, vol. 55, col. 1513 (1961).

Korshak: Chemical Abstracts, vol. 43, col. 4547 (1949).

WALTER A. MODANCE, *Primary Examiner.*

NICHOLAS S. RIZZO, *Examiner.*

R. PRICE, N. TROUSOF, *Assistant Examiners.*